United States Patent
Klein et al.

(10) Patent No.: US 9,178,567 B2
(45) Date of Patent: Nov. 3, 2015

(54) SECURE COMMUNICATION APPARATUS AND METHOD FOR A MOBILE COMPUTING DEVICE

(75) Inventors: Clifford R. Klein, Marion, IA (US);
Don A. Stulken, Marion, IA (US);
Joseph T. Rohret, Parnell, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 664 days.

(21) Appl. No.: 13/486,839

(22) Filed: Jun. 1, 2012

(65) Prior Publication Data

US 2013/0324034 A1 Dec. 5, 2013

(51) Int. Cl.
*H04B 5/00* (2006.01)

(52) U.S. Cl.
CPC .................................. *H04B 5/00* (2013.01)

(58) Field of Classification Search
CPC ............. H04B 1/3816; H04L 63/0853; H04L 2463/102; H04L 63/0492; H04M 1/72575; H04W 12/06; H04W 88/02
See application file for complete search history.

(56) References Cited

U.S. PATENT DOCUMENTS

| | | | |
|---|---|---|---|
| 8,385,057 B2* | 2/2013 | Liu et al. | 361/679.09 |
| 2004/0068659 A1 | 4/2004 | Diehl | |
| 2005/0243522 A1* | 11/2005 | Nilsen et al. | 361/716 |
| 2006/0086786 A1* | 4/2006 | Spencer, II | 235/380 |
| 2007/0176738 A1* | 8/2007 | Horler | 340/5.61 |
| 2007/0250981 A1* | 11/2007 | Seibert | 2/69 |
| 2008/0288029 A1* | 11/2008 | Healy et al. | 607/60 |
| 2009/0003637 A1* | 1/2009 | Pansell et al. | 381/314 |
| 2010/0065630 A1* | 3/2010 | Spencer, II | 235/382 |
| 2011/0177852 A1* | 7/2011 | Jain et al. | 455/575.8 |
| 2012/0295587 A1* | 11/2012 | Paya et al. | 455/411 |

FOREIGN PATENT DOCUMENTS

| | | |
|---|---|---|
| KR | 2006-0098200 A | 9/2006 |
| KR | 2008-0051767 A | 6/2008 |
| KR | 2010-0071806 A | 6/2010 |

OTHER PUBLICATIONS

International Search Report and Written Opinion regarding International Application No. PCT/US2012/061853, mail date Jan. 25, 2013, 10 pages.

* cited by examiner

*Primary Examiner* — Lewis West
(74) *Attorney, Agent, or Firm* — Angel N. Gerdzhikov; Donna P. Suchy; Daniel M. Barbieri

(57) ABSTRACT

An apparatus for a personal electronic device can include a near field communications interface and a secure communication system. The personal electronic device can be a variety of computing platforms including a tablet computer or a smart phone. The near field communication interface communicates wirelessly with the personal electronic device. The secure communication system receives encrypted data and provides non-encrypted data to the near field communication interface.

20 Claims, 4 Drawing Sheets

SECURE COMMUNICATION APPARATUS AND METHOD FOR A MOBILE COMPUTING DEVICE

BACKGROUND

The present application relates generally to the field of personal electronic device. More specifically, the present application relates to secure communications for personal electronic devices.

Personal electronic devices include mobile computing platforms, such as tablet computers (e.g., Android® tablets, iPad® tablets) and smart phones (iPhone® phones, Android phones, etc). Personal electronic devices have improved productivity and the functionality of various applications. Heretofore, portable electronic devices, such as, commercially available tablets and smart phones, have not been designed for secure applications.

Thus, there is a need for a secure interface for portable electronic devices, such as mobile computing platforms. Further, there is a need for a system for and method of adapting existing portable electronic devices for reception of secure data. Further, still, there is a need for personal electronic devices that allow secure communications. Yet further still, there is a need for secure video streams that can be provided to personal electronic devices. Further still, there is a need for personal electronic devices adapted for use in military and/or aircraft environments and/or applications.

SUMMARY OF INVENTION

An exemplary embodiment relates to an apparatus for a personal electronic device. The apparatus includes a near field communication interface for communicating wirelessly with the personal electronic device. The apparatus also includes a secure communication system. The secure communication system receives encrypted data and provides unencrypted data to the near field communication interface.

Another exemplary embodiment relates to a secure sleeve for a personal electronic device. The secure sleeve includes material configured to receive the personal electronic device, a decryption system configured to receive encrypted communications and provide decrypted communications, and an attenuator. The attenuator locally attenuates an antenna of the personal computing device. The secure sleeve also includes a communication system for providing the decrypted communications to the personal electronic device.

Another exemplary embodiment relates to a method of providing communications to a personal electronic device. The method includes receiving encrypted communication data using hardware disposed in the sleeve. The sleeve receives the personal electronic device. The method also includes decrypting the encrypted communication data and providing decrypted communication data to the personal electronic device wirelessly using near field communications.

BRIEF DESCRIPTION OF THE DRAWINGS

Exemplary embodiments will become more fully understood from the following detailed description, taken in conjunction with the accompanying drawings, wherein like reference numerals refer to like elements, in which.

DETAILED DESCRIPTION

Referring generally to the Figures, an apparatus for a personal electronic device and components thereof are shown according to exemplary embodiments. The apparatus is configured to support a personal electronic device using secure communications. For example, the apparatus may be configured to receive the personal electronic device and provide wireless communication from the outside world to the personal electronic device in one embodiment. In one embodiment, the personal electronic device may include secure communication hardware and a near field interface for communicating between a secure source and the personal electronic device. The personal electronic device can be a flat screen electronic device, such as a tablet computer (e.g., an Apple iPad, Samsung Galaxy Tab, Amazon Kindle, etc.), a smart phone (e.g., an Apple iPhone, a Windows based smart phone, an Android based smart phone, etc.), a laptop computer, a netbook, a personal digital assistant, a camera, a global positioning system (GPS) navigator, diagnostic equipment, etc.

According to one embodiment, the personal electronic device is used in military or avionic systems (e.g., air mobility command). Secure interfaces are needed for portable electronic devices when used in the avionics and military field as well as other fields. However, the present invention is not limited to the use of the apparatus in any particular field or in any particular application.

In one embodiment, the portable electronic device is a commercial, off-the-shelf device. Generally, the portable electronic device requires wireless access in both a secure environment, such as on an aircraft, and in a non-secure environment, such as in a hotel, office or public place. In one embodiment, the apparatus can be configured so that it can be both mechanically and communicatively engaged and disengaged to and from the portable electronic device for use in secure and non-secure environments, respectively. Alternatively, the apparatus can remain engaged for operation in the non-secure environment. In one embodiment, apparatus 50 can provide access to the non-secure environment.

In one embodiment, the apparatus can be embodied as a receiver, housing, protector, cover, etc. The apparatus can be embodied as a sleeve. In one embodiment, the sleeve can contain secure hardware to decrypt and encrypt data. In one embodiment, the sleeve can also locally attenuate the wireless antenna of the portable electronic device to prevent non-secure access via the wireless antenna of the portable device. In another embodiment, wireless access to the portable electronic device is replaced with an interface between the apparatus and the portable electronic device to provide a secure data transfer (e.g., by using local field wireless access) without fear of unencrypted data being improperly revealed. In addition, the apparatus can provide protection for the device, such as, in a ruggedized sleeve configuration in one embodiment.

Figure 1:
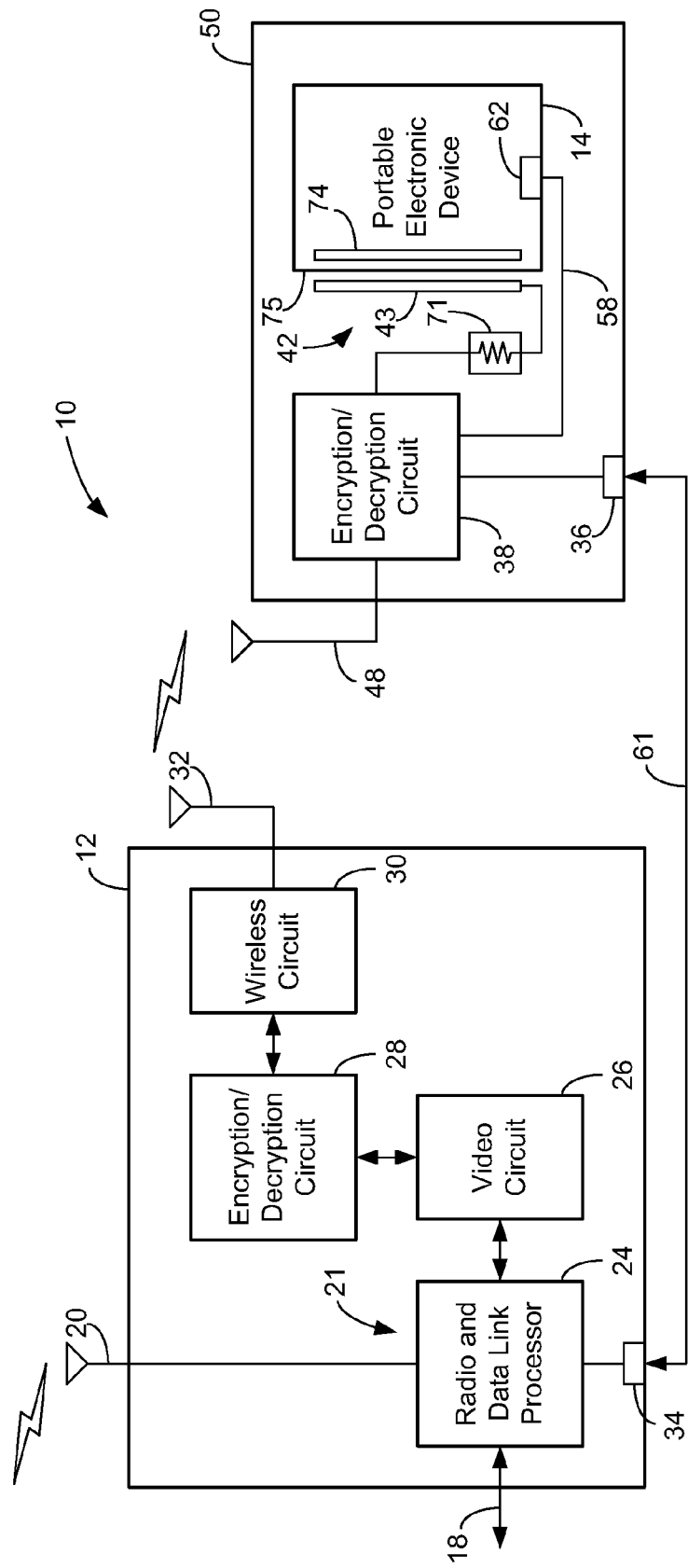
FIG. 1 is a general block diagram for a communication system including an apparatus for a portable electronic device in accordance with an exemplary embodiment.

With reference to FIG. 1, a communication system 10 includes a source 12 of encrypted data and a portable electronic device 14 associated with an apparatus 50. Source 12 can be any system capable of communicating encrypted data in various forms. Source 12 can be a camera, a sensor, a computer system, a radio, cell phone, a database, combinations thereof, etc. System 10 can be employed in any environment where encrypted data is used. In one embodiment, apparatus 50 is used in a national security environment, a military environment, or an aircraft environment.

Source 12 can include a wired connection 18, (e.g. an Ethernet connection, such as via an RJ 45 connector), a wireless interface or antenna 20, a radio and data link processor (DLP) 24, a video circuit 26, an encryption/decryption circuit 28, a wireless circuit 30 and antenna 32. In addition, a serial port 34 (e.g., a USB port) can be included. In one embodiment, source 12 can connect to an airplane interface (for connection to a computer, radio, etc.) via an Ethernet port via connection 18 or serial port via port 34.

System 10 can be employed for a variety of operations, such as providing encrypted video data in a video stream to device 14 in one embodiment. The encrypted video data can represent secure data associated with maps, missions, targeting, flight plan, etc. Data can be received by source 12 via wired connection 18, such as an Ethernet connection, or via wireless connection using antenna 20. Alternatively, source 12 can provide data from storage or produce data (e.g., from a camera or sensor).

Radio and data link processor 24 can include an interface for network communications via connection 18 and an interface for communication via serial port 34. Connections 18 and 20 are optional in one embodiment. System 10 can provide two-way and one way communications, although detailed discussions below are generally directed to communication of data from source 12 to portable electronic device 14.

Radio and data link processor (DLP) circuit 24 can be a secure radio system and provide the data as video graphics array (VGA) video to video circuit 26. Radio and DLP circuit 24 can be configured for wireless communication over a variety of channels, band widths, formats, etc. In one embodiment, radio and DLP circuit 24 is a secure radio and can be embodied as a Link 16 Terminal or MIDS (multifunctional information distribution system).

Video circuit 26 can utilize an Ethernet format or other format to provide the video data to encryption/decryption circuit 28. Encryption/decryption circuit 28 can provide encrypted data to a wireless circuit 30. Wireless circuit 30 can be a file server with a wireless interface such as an IMS 6000 device manufactured by Rockwell Collins, Inc.

Encryption/decryption circuit 28 can be any secure translation circuit. Circuit 28 can be a Turnstile™ circuit manufactured by Rockwell Collins, Inc., a Microturnstile™ circuit manufactured by Rockwell Collins, Inc., a cross domain guard circuit, or other guard circuit. In one embodiment, a Microturnstile™ or cross domain guard can be provided between circuit 26 and circuit 30 as encryption/decryption circuit 28.

Video circuit 26 can be a DTU-7000 manufactured by Rockwell Collins, Inc. Generally, the video stream data is perishable upon removing power from apparatus 50. All video buffers (e.g., in circuit 26 and in 14) are flushed when apparatus is powered off in one embodiment. Circuit 26 can be a portable electronic device standard circuit in one embodiment. If video streaming is not necessary, circuit 26 can be removed and data can be provided according to other formats to wireless circuit 30.

In one embodiment, the video data can represent an open edge situational awareness display (SAD), a FalconView™ system developed by Georgia Institute of Technology, data link objects, various video objects, or web-based video. Various content can be provided as data or video data to device 14. The data can represent graphics, text, messages, voice, audio, etc.

Figure 2:
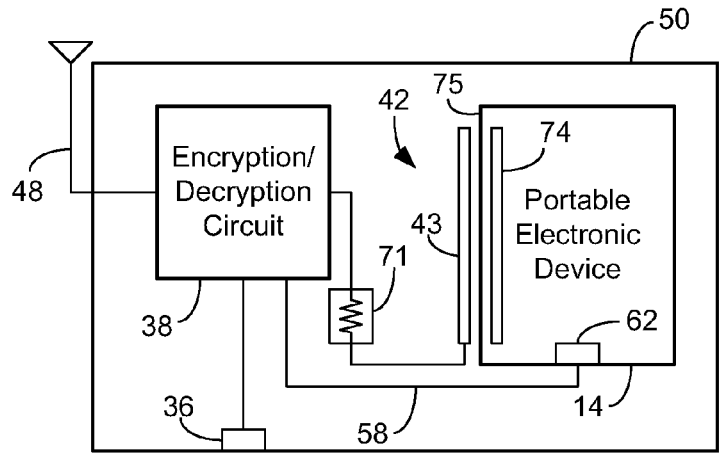
FIG. 2 is a more detailed block diagram of the apparatus for a portable electronic device illustrated in FIG. 1 in accordance with another exemplary embodiment.

With reference to FIGS. 1 and 2, apparatus 50 receives portable electronic device 14 and includes an encryption/decryption circuit 38, a near field interface 42 and an antenna 48. Apparatus 50 can also include a serial connection 58 coupled to portable electric device 14 and a serial connector 36. In one embodiment serial connection 58 (e.g. a USB port) can be connected to a serial connector 62 (e.g., a USB port) of portable device 14. Connection 58 can be configured so that connection 58 is electronically coupled to connection 62 when device 14 is received within apparatus 50. Serial connection 34 (FIG. 1) can be coupled to a serial connection 36 of source 12 (e.g., USB port) of apparatus 50.

Encryption/decryption circuit 38 is similar to encryption/decryption circuit 28. Circuit 38 serves to decrypt communications received from antenna 48 or port 36 and encrypt communications received from interface 42 or connection 58. Although encryption/decryption circuit 28 is shown as including encryption and decryption features, circuit 28 can be provided as a decryption circuit in one embodiment.

In one embodiment, a near field communication interface 42 provides data wirelessly from apparatus 50 to device 14. In one embodiment, interface 42 is embodied as a non-radiating near field coupling as opposed to a far field radiation conventionally associated antennas and radio links. According to one embodiment, device 14 can provide strong fields that radiate small distances while the radiation for decrypted data from the apparatus 50 to device 14 is almost nil. Interface 42 can include at least one conductor embodied as a short range antenna. Interface 42 can operate as a wifi, Bluetooth or other wireless interfaces. Alternatively, interface 42 can employ a loop antenna or other air core transformer-based interface.

Interface 42 does not provide significant range for communications between apparatus 50 and portable electronic device 14 in one embodiment. In one embodiment, the range for communication with interface 42 is less than a few centimeters. The close mechanical interface between apparatus 50 and device 14 and the position of interface 42 and near field coupling device 74 ensures appropriate near field communication between apparatus 50 and device 14 in one embodiment. Devices 74 and 42 can be disposed in parallel with respect to each other in one embodiment.

Figure 3:
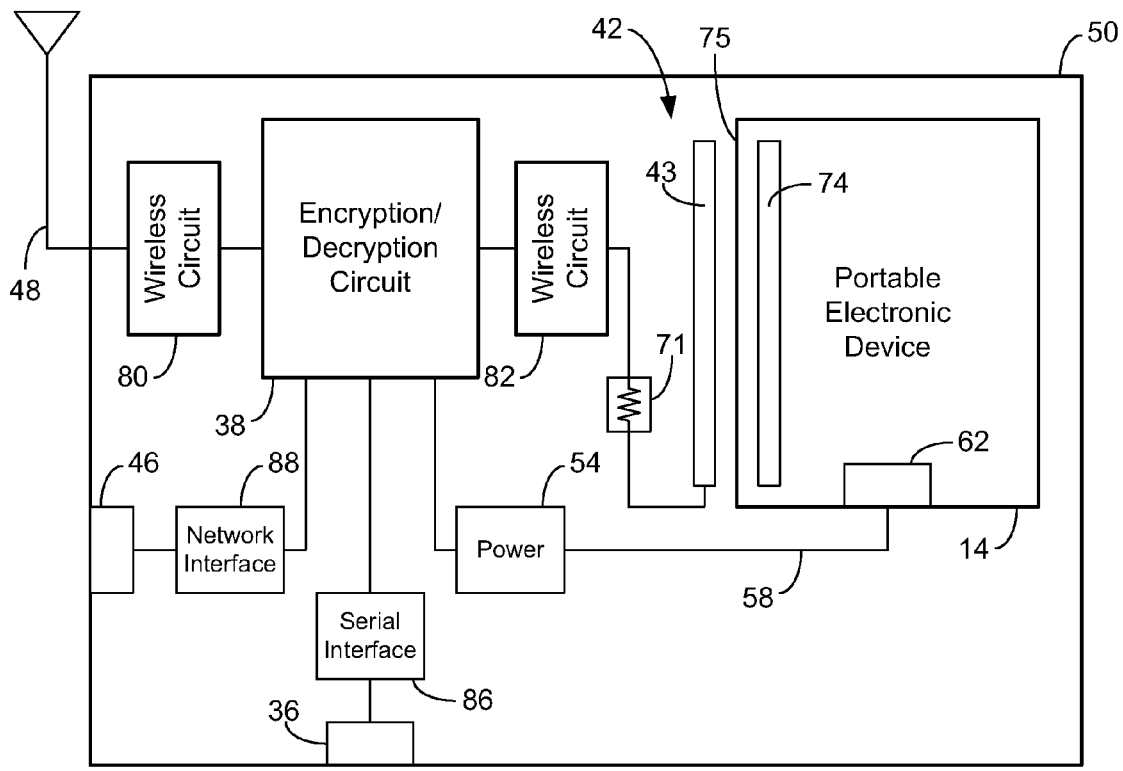
FIG. 3 is a more detailed block diagram of the apparatus in accordance with another exemplary embodiment.

With reference to FIG. 3, interface 42 of apparatus 50 includes a near field coupling device 43 in one embodiment. Near field coupling device 43 can be embodied as conductive strip or wire. In one embodiment, an attenuator 71 attenuates communications to and from near field coupling device 43 associated with portable electronic device 14. Near field coupling device 43 is generally disposes along an edge 75 of portable electronic device 50. Near field coupling device 43 can be a conductive strip, wire, WiFi antenna, cellular antenna, or a combination thereof, etc. Attenuator 71 can be a fixed attenuator or an adjustable attenuator (e.g., switched or variable). Attenuator 71 can be embodied as a resistive, PIN diode, RF attenuator, etc.

With reference to FIG. 3, apparatus 50 and circuitry therein can be powered using power from portable electronic device 14 via serial connection 58. Power circuit 54 provides power to components of apparatus 50. Circuit 54 is powered by connection 58. Alternatively, circuit 54 can be powered by source 12 via connection 61 or by a battery associated with apparatus 50.

With reference to FIG. 1, apparatus 50 and data source 12 communicate encrypted data via a wireless interface (e.g. WiFi interface, etc.) using antennas 48 and 32. In addition, serial ports such as an Ethernet port or USB ports can be utilized to provide communications between source 12 and apparatus 50 via connection 61. Serial network interface 86 and network interface 88 can be included with apparatus 50. Information received by encryption/decryption circuit 38 can be provided in non-encrypted form for reception by portable electronic device 14.

In one embodiment, a near field communication interface 42 is utilized to prevent non-encrypted data from being transmitted out of the secure environment associated with portable electronic device 14. Interface 42 includes an attenuator 71 for near field coupling device 43 disposed adjacent antenna or near field coupling device 74 of device 14.

In one embodiment, near field coupling device 43 can be placed at a position for optimum reception of near filed communications between device 14 and apparatus 50. In one embodiment, shielding can be provided for near field interface 42. For example, shielding can be provided above and below device 43 or surround device 43 on three sides (e.g., leaving the side next to device 74 unshielded) in one embodiment. Near field coupling device 43 can also be configured for direction communications (e.g., preferably directed to near field coupling device 74. Near field coupling device 74 can be similar to near field coupling device 43 and can be coupled to an attenuator similar to attenuator 71 in one embodiment. In such an embodiment, personal electronic device 14 can be retrofitted to include device 74 similar to device 43. Alternatively, near field coupling device 74 can be the WiFi, Bluetooth, cell phone or other antenna provided with personal electronic device 14. In such an embodiment, device 14 does not require retrofitting for use with apparatus 50. In another embodiment, the WiFi, Bluetooth, cell phone or other antenna provided with personal electronic device 14 can be retrofitted to include an attenuator. Apparatus 50 can be easily removed from device 14 for use in a non-secure environment. Alternatively, non-secure communications can be performed using the WiFi or other antenna of device 14 while apparatus 50 is engaged to device 14 or non-secure communications can be performed using a channel through apparatus 50.

With reference to FIG. 3, apparatus 50 includes a wireless circuit 80. Wireless circuit 80 can be a radio and data processor and various hardware for providing encrypted data and other data received at antenna 20 to encryption/decryption hardware 38. Serial interfaces 86 and network interface 88 can provide appropriate timing, buffering, etc. for ports 36 and 46 respectively.

Apparatus 50 also includes a wireless circuit 82 for providing wireless communication via antenna 74 and near field communications interface 42. Wireless circuit 82 can include a radio and other circuitry for providing wireless communications according to communication standards associated with reception of wireless data by portable electronic device 14.

Advantageously, apparatus 50 allows a commercial, off-the-shelf tablet computer or smart phone to receive secure communication without requiring modification of the circuitry of device 14. Apparatus 50 uses the standard WiFi connection associated with device 14 in one embodiment. Decrypting and encrypting functions are performed within apparatus 50. In one embodiment, there is no hardwired connections between device 14 and apparatus 50. In another embodiment, the power connection using port 62 is the only wired connection 58 between apparatus 50 and device 14 and that connection is not used for data communication associated with display of mission information on device 14. Alternatively, circuit 54 can be powered through port 36 coupled to port 34 of source 12 or port 62 of device 14.

Figure 4:
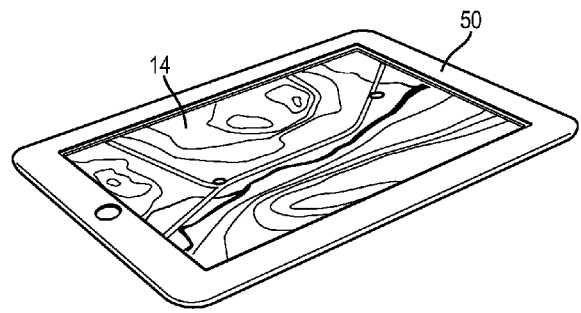
FIG. 4 is a perspective view schematic drawing of an apparatus for a personal electronic device in accordance with an exemplary embodiment.
Figure 5:
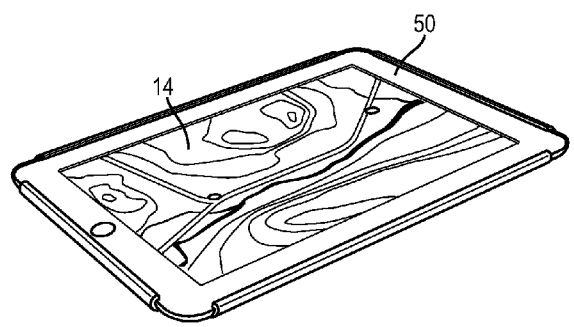
FIG. 5 is a perspective view schematic drawing of an apparatus for a personal electronic device in accordance with another exemplary embodiment.
Figure 6:
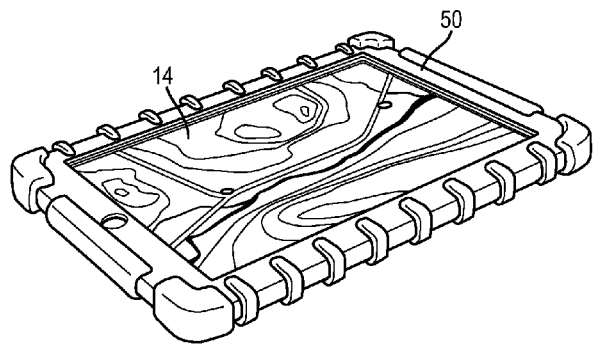
FIG. 6 is a perspective view schematic drawing of an apparatus for a personal electronic device in accordance with yet another exemplary embodiment
Figure 7:
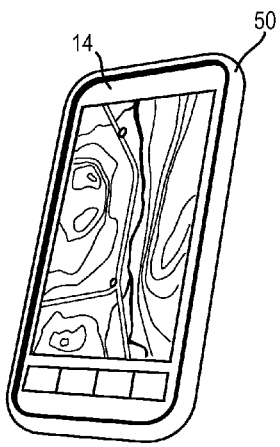
FIG. 7 is a perspective view schematic drawing of an apparatus for a personal electronic device in accordance with another exemplary embodiment.

With reference to FIG. 4, apparatus 50 is embodied as a sleeve or other protector for device 14. With reference to FIG. 5, the sleeve covers backs and edges of portable electronic device 14 (e.g., surrounds device 14). With reference to FIG. 6, apparatus 50 is shown as a sleeve including a ruggedized surface. With reference to FIG. 7, apparatus 50 is configured for device 14 embodied as a smart phone.

Figure 8:
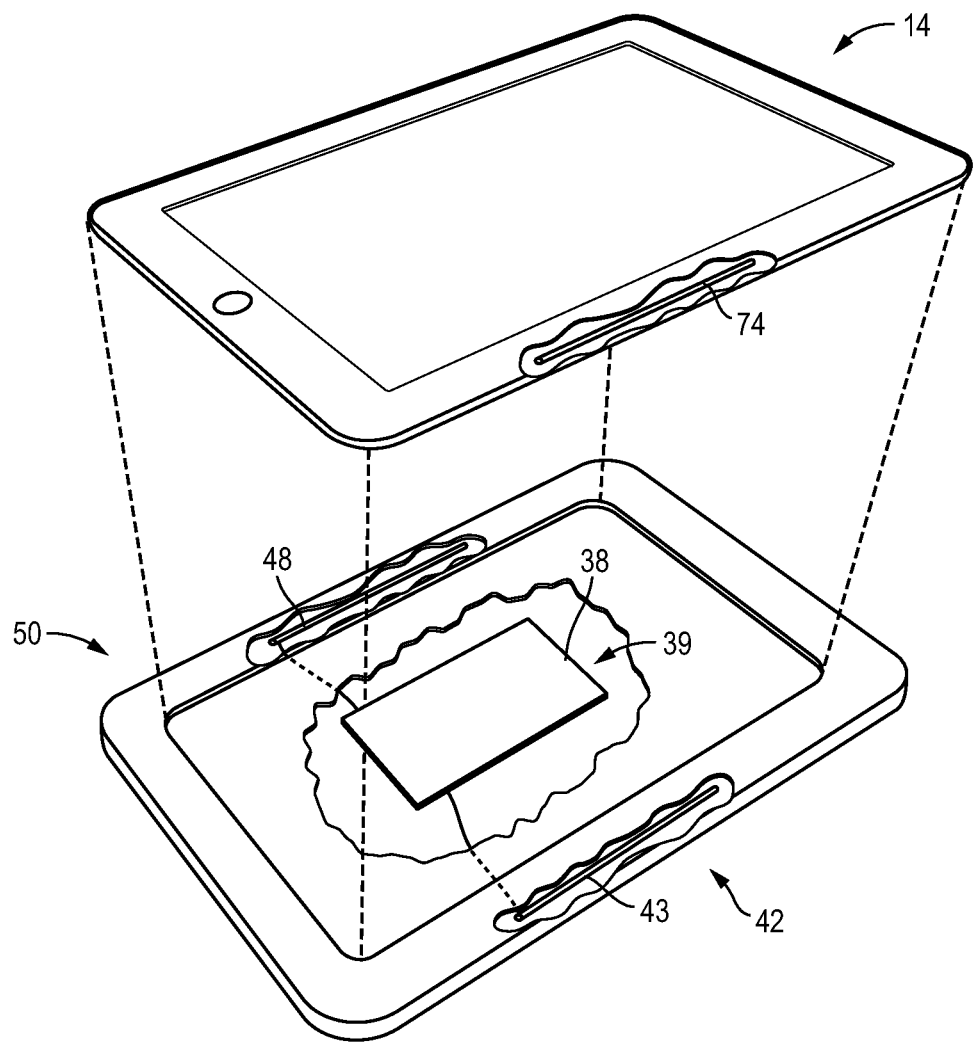
FIG. 8 is a perspective view schematic drawing of an apparatus for a personal electronic device in accordance with another exemplary embodiment.

With reference to FIG. 8, apparatus 50 is configured as a secure sleeve for device 14 and includes antenna 48 on a first side 44 and near field coupling device on a second side 55. A circuit board 38 can include electronics associated with apparatus 50 (e.g., circuits 80, 38, 82, and 54 and interfaces 86, and 88). Circuit board 48 can be disposed in a cavity 39 in the housing of apparatus 50. Apparatus 50 can include extra space for batteries, memory, etc. Apparatus 50 can include a user interface for inputting a pass code to allow device 14 and apparatus 50 to communicate in one embodiment. Alternatively, a biometric device disposed on apparatus 50 can be utilized to ensure an appropriate user is accessing apparatus 50. In another alternative, an application is provided on personal electronic device 14 that requires a password before communication between personal electronic device 14 and apparatus 50 takes place.

It is noted that apparatus 50 can be formed of various materials and include various structures for receiving portable electronic device 14. For example, apparatus 50 can be a high impact plastic, such as, polycarbonate, PVC, ABS, etc., can include metal, or can include softer plastics. Apparatus 50 can also include nubs or bumpers as well as additional padding or protection along edges and corners for ruggedization. Apparatus 50 can be embodied as a book-like cover for device 14. In one embodiment, device 14 is slid into apparatus 50 and includes a hinged cover for covering a top surface of portable electronic device 14. Circuitry and packaging for apparatus 50 can be provided on a back or bottom side of the sleeve The construction and arrangement of the elements of the holding apparatus as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. An apparatus for a personal electronic device, comprising:
   a near field communication interface for communicating wirelessly with the personal electronic device; and
   a secure communication system for receiving encrypted data and providing non-encrypted data to the near field communication interface;
   wherein the near field communications interface is disposed in a sleeve for the personal electronic device, the near field communication interface being disposed along an edge of the personal electronic device when the sleeve is attached to the personal electronic device; and
   wherein the near field communications interface is configured to provide near field communications to an antenna for wireless reception by the personal electronic device.

2. The apparatus of claim 1 further comprising a serial connector for connections to a USB port of the personal electronic device.

3. The apparatus of claim 1, wherein the antenna is an antenna for Bluetooth or LAN communications.

4. The apparatus of claim 2, wherein the apparatus is powered via the USB port.

5. The apparatus of claim 1, wherein the secure communication system includes encryption hardware including at least one of a turnstile circuit, a microturnstile circuit, and a cross domain guard circuit.

6. The apparatus of claim 5, wherein the secure communication system further includes a radio unit for receiving the encrypted data from a wireless source.

7. The apparatus of claim 1, wherein shielding is provided for the near field communications interface.

8. The apparatus of claim 7, wherein at least a side of the near field communications interface is unshielded, wherein the side is next to the edge of the personal electronic device.

9. A secure sleeve for a personal electronic device, comprising:
   a material configured to receive the personal electronic device;
   a decryption system configured to receive encrypted communications and provide decrypted communications;
   an attenuator; and
   a wireless communication system for providing the decrypted communications from the sleeve to the personal electronic device, wherein the attenuator is attached to the material and is configured to attenuate communications between the wireless communication system and the portable electronic device when the portable electronic device is received in the material.

10. The apparatus of claim 9, wherein the material is ruggedized.

11. The apparatus of claim 10, wherein the personal electronic device is a commercially available tablet.

12. The apparatus of claim 9, wherein the wireless communication system uses near field communications.

13. The apparatus of claim 12, wherein the communications system uses non-radiating near field communications.

14. A method of providing communications to a personal electronic device, the method comprising:
   replacing wireless access to the personal electronic device by:
      receiving encrypted communication data using hardware disposed in a sleeve, the sleeve receiving the personal electronic device;
      using an attenuator disposed within the sleeve in order to locally attenuate an antenna of the personal electronic device;
      decrypting the encrypted communication; and
      providing the decrypted communication data to the personal electronic device wirelessly using near field communications.

15. The method of claim 14, wherein the encrypted communications are military or avionic video communications.

16. The method of claim 15, wherein the video communications are a video stream.

17. The method of claim 14, wherein the personal electronic device is a tablet, a phone or a lap top.

18. The method of claim 14, further comprising powering the hardware using a USB port of the personal electronic device.

19. The method of claim 14, wherein the sleeve includes a USB port.

20. The method of claim 14, wherein the hardware is partially shielded.

* * * * *